United States Patent [19]

Miles

[11] 3,975,043
[45] Aug. 17, 1976

[54] GRIPPING DEVICE

[76] Inventor: Leslie John Miles, 37 Garrick St., Gympie, Queensland 4570, Australia

[22] Filed: Mar. 4, 1975

[21] Appl. No.: 555,122

[30] Foreign Application Priority Data
Mar. 4, 1974  Australia.......................... 6797/74

[52] U.S. Cl............................... 294/25; 294/16
[51] Int. Cl.²......................................... B65G 7/12
[58] Field of Search ............... 294/8.5, 11, 16, 25, 294/33, 99 R, 106, 131; 2/16, 20, 160, 161 R, 161 A; 43/5, 53.5 R

[56] References Cited
UNITED STATES PATENTS

| | | | |
|---|---|---|---|
| 941,798 | 11/1909 | Moore | 294/25 X |
| 2,244,072 | 6/1941 | Ledbetter | 294/25 |
| 2,263,965 | 11/1941 | Fiori | 294/99 R |
| 2,506,839 | 5/1950 | Mead | 294/106 X |
| 2,800,356 | 7/1957 | Benton | 294/106 |
| 2,881,022 | 4/1959 | Brust | 294/16 |
| 3,181,198 | 5/1965 | Stelzen | 294/25 X |
| 3,259,415 | 7/1966 | Howard | 294/16 |
| 3,356,405 | 12/1967 | Gruber | 294/16 X |

Primary Examiner—Johnny D. Cherry

[57] ABSTRACT

A gripping device including a pair of side assemblies, each having a substantially constant arcuate cross-sectional configuration throughout its length, projections on its concave inner surface, and free outer edges while their inner edges are hingedly connected together by a hinge to enable said outer edges to be moved towards or away from one another. One said side assembly has along its inner edge a channel and the other is provided with a bead along its inner edge which is pivotally engageable within said channel by relative longitudinal sliding movement therebetween. A torsion-bar spring assembly is disposed adjacent the hinge and connected at its opposite ends into a recess in the respective side assembly and adapted to urge the said side assemblies apart. The parts are so made and arranged that said device may be held within a cupped hand of a user with the outer edges remote from the palm of the hand and disposed substantially parallel to the pivot axis of the user's hand.

3 Claims, 6 Drawing Figures

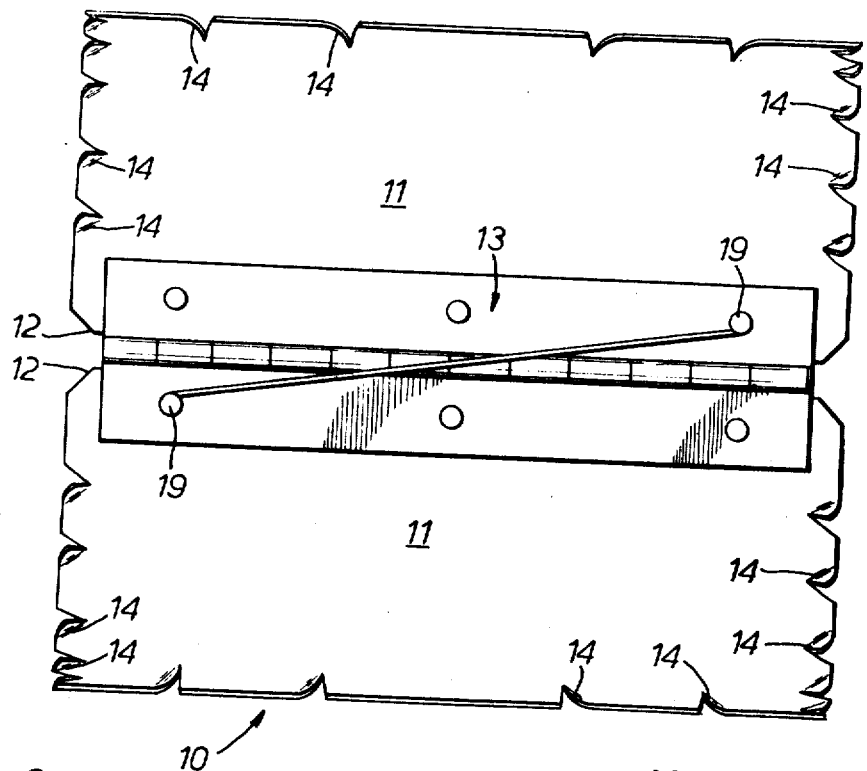
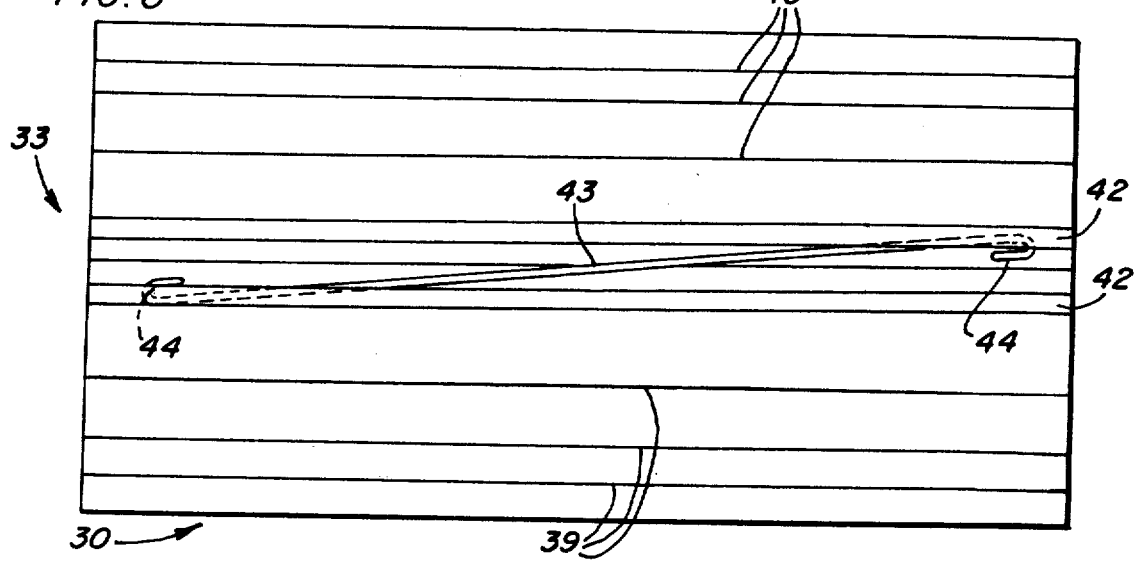

GRIPPING DEVICE

This invention relates to a device for holding objects which one may not desire to hold in one's bare hands and in particular it relates to a device for gripping fish.

For illustration purposes, the present invention will be described in relation to its application for gripping fish, but of course the invention in various forms may be used for other applications where it is desired to grasp an object in the cupped hand and at the same time shield the hand from the object.

Many fish can not be handled by an inexperienced angler without the risk of injury being inflicted to the angler's hand. While in some cases the injury may be of a minor nature, in other cases the injury can be very painful and of a serious nature. At present, in many instances, if a venomous fish or fish having sharp fins or the like is caught by an angler it is normal for the angler to restrain the fish beneath his foot so that the hook can be removed from the fish's mouth. While this may be satisfactory if the angler is fishing from a stable platform it can be very dangerous when the angler is fishing from a small dinghy, in which case the fish may end up jumping all round the bottom of the boat, entangling the lines in the process.

Furthermore, after the fish has been restrained for hook removal purposes, it will sooner or later become necessary to gut and scale the fish. Again, to gut the fish, the fish has to be held by its back so that free access is provided to its underside. Unless certain fish are held in the correct manner for this purpose, painful injuries can be caused to the angler.

Accordingly, this invention resides in a gripping device including a pair of side assemblies having free outer edges while their inner edges are operatively connected together by hinge means to enable said free outer edges to be moved pivotally towards or away from one another, and the parts being so made and arranged that said device may be held within a cupped hand of a user with said free edges remote from the palm of the hand and an elongate opening formed between the spaced free edges disposed substantially parallel to the pivot axis of the user's hand, whereby an elongate object aligned with said pivot axis may be passed between said free outer edges into the cupped hand for gripping thereby and said object when thus gripped being shielded from said hand by said gripping device.

In order that the invention may be more readily understood and put into practical effect, reference will now be made to the accompanying drawings which illustrate several of the preferred embodiments of the invention, and wherein:

FIG. 3 is an inverted plan view of the device shown in FIGS. 1 and 2.

FIG. 6 is an inverted plan view of the embodiment shown in FIG. 4.

Figure 1:
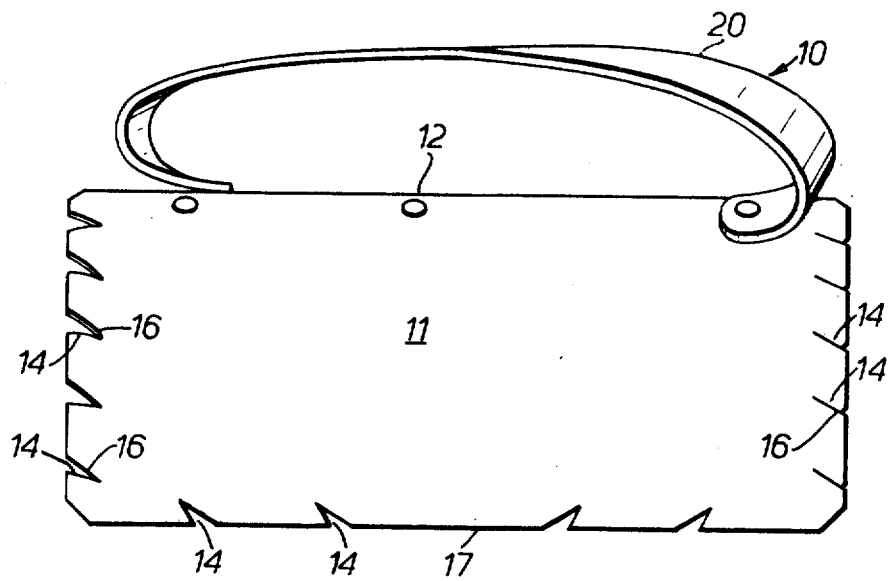
FIG. 1 is a side elevational view of the one form of the gripping device fabricated from light gauge metal plate.
Figure 2:
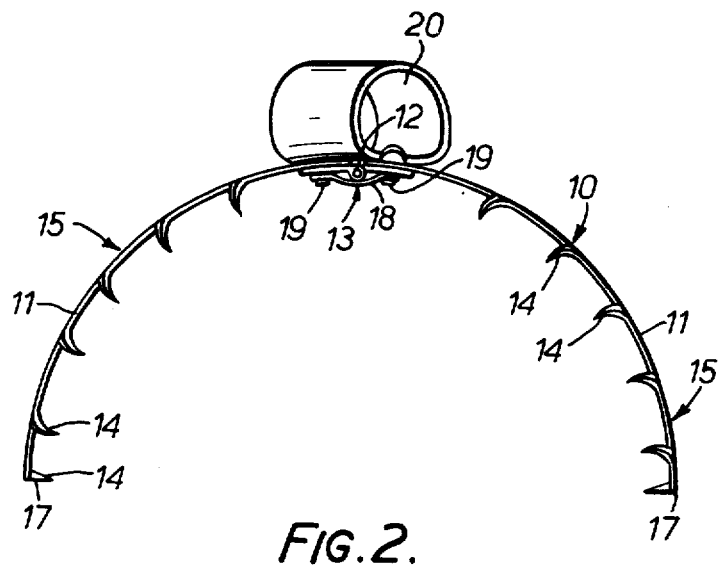
FIG. 2 is an end elevational view of the device shown in FIG. 1.

Referring now to the embodiment illustrated in FIGS. 1 to 3, there is shown a fish holding device 10 comprising a pair of similar elongate side assemblies 11 joined pivotally together at their inner edges 12 by means of a longitudinally extending hinge assembly 13. Each side assembly 11 is provided with inwardly directed retaining claws 14 around its outer periphery, remote from said hinge assembly 13 and each claw 14 in this embodiment comprises a deformed edge portion 15 formed by slitting the edge at 16 to form a barb portion which is bent inwards to form the claws 14.

As shown, the two side assemblies 11 of the fish holding device 10 are spring urged outwards to an open position at which their free outer edges 17 are spaced widely apart, as shown, by means of a torsion-bar spring 18 which is secured at its ends to opposite side assemblies 11 by the respective rivets 19 which secure the hinge 13 to the side assemblies 11. Also, the fish gripping device 10 is provided with a hand strap 20 under which the hand may be placed to enable a user to hold easily and retain device 10 in the cupped hand. It is preferred that the device be made from non-corrosive metal such as stainless steel or aluminium to ensure that the device 10 will give satisfactory service.

In use, the angler places his hand through the hand strap 20 with his hand extending around the outer surface of the side assemblies 11 so that the device is effectively retained in the cupped hand. Opening and closing action of the cupped hand about its pivot axis formed by the in-line knuckles as desired will cause the free outer edges 17 to move apart or towards one another and thus it may be used to pick up and hold fish of various sizes. Also, once held, the fish can be easily gutted as the free edges 17 of the hand members 11 are spaced apart to form an elongate opening registering with the fish's gut to enable a knife blade to be inserted therebetween as well as moved longitudinally for cleaning purposes.

Figure 4:
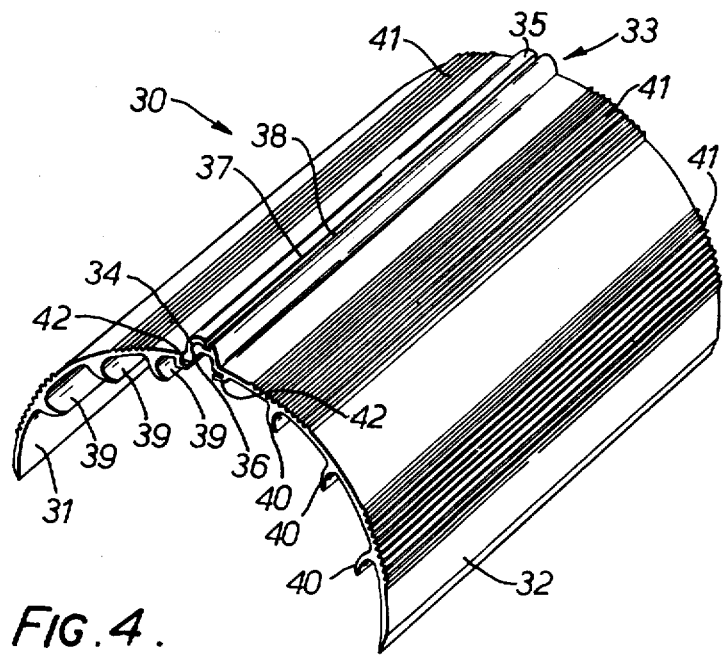
FIG. 4 is a perspective view of a further embodiment of the invention formed from aluminium extrusions.

The gripping device 30 illustrated in FIG. 4, is assembled by slidably engaging two aluminum extruded sections — a left-hand section 31 and a right-hand section 32. In this embodiment, the hinge assembly 33 is provided by extruding integrally with the respective side members complementary hinge portions comprising a part-circular longitudinally extending recess 34 within the upwardly extending housing 35 on the left-hand portion 31, and a longitudinally extending part-circular bead portion 36 which is adapted to be slidably engaged within the recess 34 for pivotal movement therewithin. The bead portion 36 constitutes the upper terminal portion of the right-hand side member 32, and in order to restrict the pivotal movement of the members 31 and 32, there are provided flange portions 37 and 38 which are adapted to abut to limit the outward pivotal motion of the side assemblies 31 and 32.

As shown, the left-hand assembly 31 is provided with three inwardly and upwardly directed ridges 39 while the right-hand assembly 32 has three corresponding sections 40 which are directly inwardly and downwardly. These ridges are adapted to deform the fish to ensure non-slip gripping therein. The exterior surfaces are also ribbed as shown at 41 to provide non-slip retention within the cupped hand.

In this embodiment, a torsion spring bar spring 43 is used to urge apart the side sections 31 and 32 and the torsion bar spring has hoops 44 at both ends which fit within the respective recesses 42 formed adjacent the hinge means 33. After the parts have been slidably engaged and located with their ends aligned, the spring is inserted and the flanges forming the respective recesses are centre-popped to extend down into the hoop ends of the bar spring. Thus the bar spring 43 as well as acting to urge the side assemblies apart also serves to maintain the relative longitudinal alignment of the sections 31 and 32.

Figure 5:
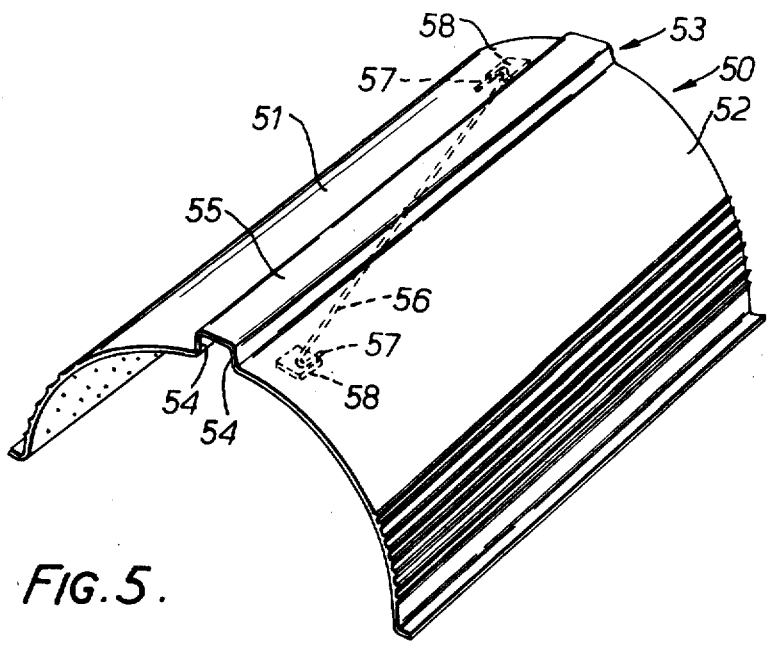
FIG. 5 is a perspective view of a one piece plastic embodiment of the invention.

In the embodiment 50 illustrated in FIG. 5, the side assemblies 51 and 52 are plastic and are formed integrally with the hinge means 53, the latter comprising necked portions 54 interconnecting the assemblies 51 and 52 to the centre hinge portion 55. Again in this embodiment a torsion-bar spring 56 is utilized. In this arrangement the ends 57 of the bar spring are hooked and fitted into pockets 58 formed on the inner surfaces of the opposite ends of the respective side assemblies 51 and 52.

While the above preferred embodiments have been given by way of illustrative example it will, of course, be realised that many modifications of constructional detail and design may be made thereto by persons skilled in the art without departing from the broad scope and ambit of the invention as is defined in the appended claims.

I claim:

1. A gripping device including a pair of side assemblies each having a substantially constant arcuate cross-sectional configuration throughout its length and projections on its concave inner surface, said side assemblies having free outer edges and also having inner edges, hinge means hingedly connecting said inner edges together to enable said outer edges to be moved towards or away from one another to form therebetween an adjustable opening into a diverging chamber formed between said side assemblies, one said side assembly having along its inner edge a channel having a restricted opening and the other said side assembly being provided with a bead along its inner edge which is pivotally engageable within said channel by relative longitudinal sliding movement therebetween to form said hinge means; a torsion-bar spring assembly disposed adjacent said hinge means and connected at its opposite ends into a recess in the respective side assembly and adapted to urge the said side assemblies apart, said recesses being disposed adjacent said hinge means and being deformable to claim the respective end of said torsion-bar spring therein to maintain said side assemblies in their operative longitudinal relationship, and the parts being so made and arranged that said device may be held within a cupped hand of a user with said outer edges remote from the palm of the hand and disposed substantially parallel to the pivot axis of the user's hand, whereby an elongate object aligned with said pivot axis may be passed between said outer edges into the cupped hand for gripping thereby and said object when thus gripped being shielded from said hand by said gripping device.

2. A gripping device according to claim 1, comprising means for retention of said device within the user's hand.

3. A gripping device according to claim 1, wherein each said side assembly is formed of extruded aluminum.

* * * * *